United States Patent [19]

Sugimoto

[11] 4,379,258

[45] Apr. 5, 1983

[54] POWER CONTROL CIRCUIT FOR INDUCTION MOTOR

[75] Inventor: Hidehiko Sugimoto, Nagoya, Japan

[73] Assignee: Mitsubishi Denki Kabushiki Kaisha, Tokyo, Japan

[21] Appl. No.: 256,224

[22] Filed: Apr. 21, 1981

[30] Foreign Application Priority Data

Apr. 22, 1980 [JP] Japan ................................ 55-53403

[51] Int. Cl.³ .............................................. H02P 5/40
[52] U.S. Cl. .................................... 318/805; 318/729; 318/812
[58] Field of Search ........... 318/345 P, 345 H, 345 C, 318/729, 812, 805, 809, 317, 331

[56] References Cited

U.S. PATENT DOCUMENTS

| | | | |
|---|---|---|---|
| 3,441,823 | 4/1969 | Schlabach | 318/805 |
| 3,601,673 | 8/1971 | Mason | 318/317 |
| 4,039,913 | 8/1977 | Clegg | 318/345 C |
| 4,117,408 | 9/1978 | Comstedt | 328/133 |

*Primary Examiner*—David Smith, Jr.
*Attorney, Agent, or Firm*—Wenderoth, Lind & Ponack

[57] ABSTRACT

A control circuit 3 for an induction motor 2 detects the voltage applied across the motor winding and the current flowing therethrough. The supply power and the feedback power are determined from the detected voltage and current and are supplied to a computing unit whose output controls a voltage regulator such that the voltage applied across the motor winding results in a fixed, predetermined ratio between the effective and apparent powers to maximize the motor efficiency and to minimize the motor's power consumption regardless of variations in the line voltage and fluctuations in the motor load.

4 Claims, 8 Drawing Figures

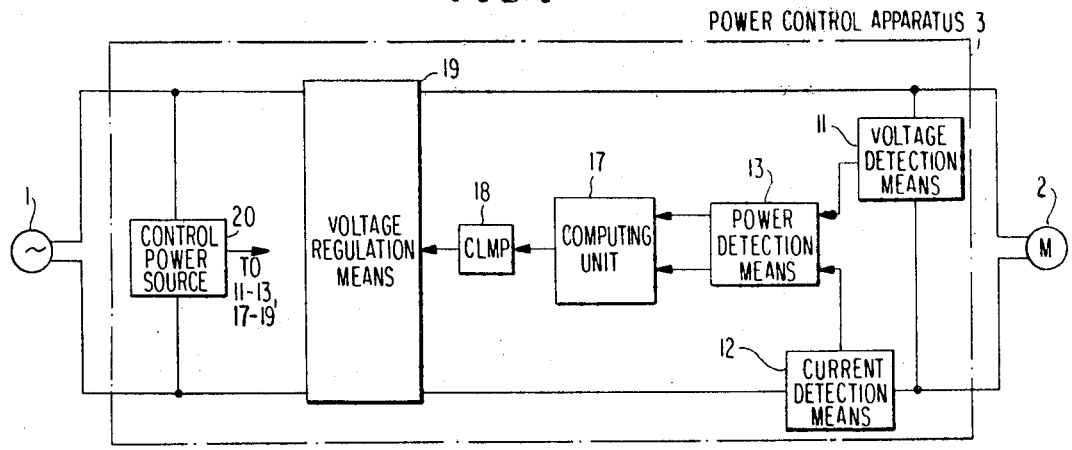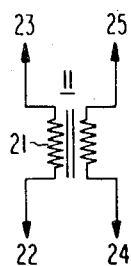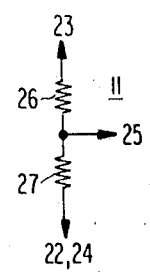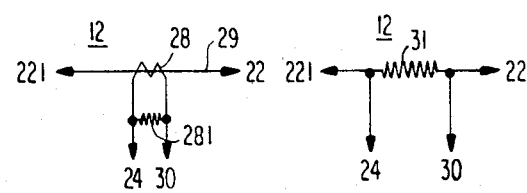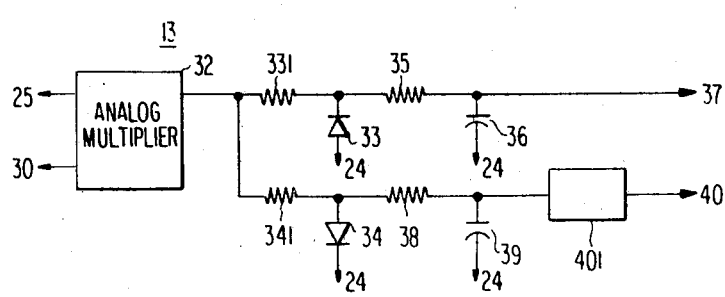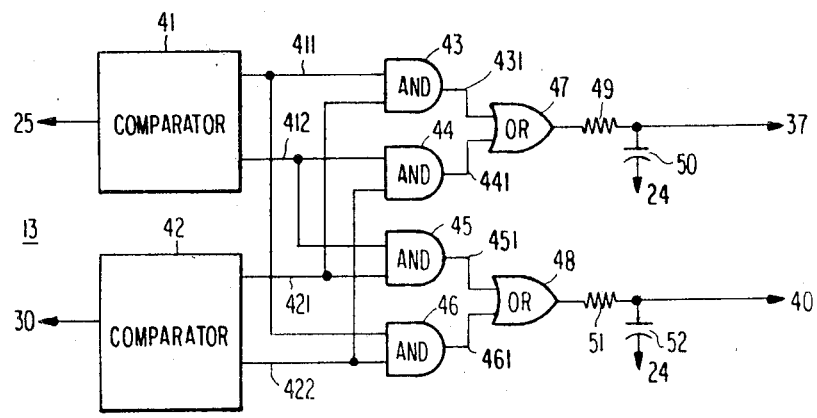

POWER CONTROL CIRCUIT FOR INDUCTION MOTOR

BACKGROUND OF THE INVENTION

This invention relates to an energy saving circuit for controlling the voltage applied to an induction motor as a function of both the motor load and the power source or line voltage.

When an induction motor is operating at a given output or load level, the input voltage to the motor typically varies with fluctuations in the power supply or line voltage. Generally speaking, a reduction of the voltage applied to the motor when the load is small and an increase of the applied voltage when the load is large tend to reduce the overall power consumed by the motor. The regulation of the voltage applied to the motor winding in accordance with the magnitude of the load driven by the motor can thus implement considerable power savings.

A prior art power factor control apparatus for an alternating current induction motor is disclosed in U.S. Pat. No. 4,052,648 to Nola, and includes the following features:

(a) current sampling means connected with each phase winding of the motor for providing an AC output signal in phase with the current through the winding, (b) voltage sampling means for sensing the voltage of an electrical input applied to the winding and for providing an output signal in phase with the voltage across the winding, (c) phase detection means responsive to the outputs of the current and voltage sampling means for providing an output which varies in accordance with the phase difference between the sampled current and voltage signals, and (d) control means connected in series with each motor winding and responsive to the output of the phase detection means for varying the duration of the "on" time of each input power cycle to the motor winding in inverse proportion to the difference in phase between the sampled current and voltage whereby an increase in the difference between the magnitude of the voltage and the magnitude of the load applied to the motor is compensated for by a reduction in power to the motor, generally improving its efficiency.

The power factor control apparatus of U.S. Pat. No. 4,052,648 thus provides, as set forth above, an inversely proportional relationship of the phase difference between the current flowing through each phase winding of an AC induction motor and the input voltage applied thereacross for controlling the conduction period in each cycle. Stated another way, the phase difference determination controls the conduction period in an inversely proportional manner.

The phase difference between the current flowing to a winding of an induction motor and the input voltage applied thereacross is affected by both the magnitude of the input voltage and the load on the motor. It is thus possible that although the input voltage magnitude and the motor load both differ or change, the phase difference remains the same. As a result, this prior art method wherein the phase difference determines the conduction period in an inversely proportional manner does not always maximize the efficiency of the motor operation.

SUMMARY OF THE INVENTION

The present invention overcomes this disadvantage of the prior art by providing a power control circuit for an induction motor in which both the supply power and the feedback power supplied to the motor are detected, and the voltage applied across the motor winding is then controlled in response to such detection to achieve a predetermined relationship or ratio between the supply and feedback powers which maximizes the motor efficiency and minimizes its power consumption.

BRIEF DESCRIPTION OF THE DRAWINGS

FIG. 1 is a block diagram illustrating one embodiment of the present invention, and FIGS. 2A to 8B are circuit diagrams illustrating embodiments of each block element of FIG. 1.

DETAILED DESCRIPTION OF THE PREFERRED EMBODIMENTS

Figure 5:
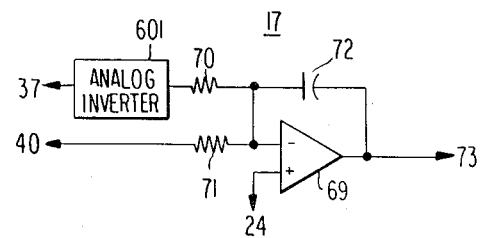

In FIG. 1 an alternating current power source 1 supplies an induction motor 2 through a power control circuit 3. A circuit 11 detects the input voltage applied across the winding of the motor; a circuit 12 detects the current flowing through the motor winding, and the outputs of these voltage and current detectors are supplied to a circuit 13 which detects both the supply power (a positive power which is the product of the instantaneous voltage value and the instantaneous current value) from the AC source 1 to the motor 2, and the feedback power (a negative power which is the product of the instantaneous voltage value and the instantaneous current value) from the motor to the AC source. These supply power and feedback power outputs are coupled to a computing unit 17 which determines the relationship between the supply power and the feedback power. The output from the computing unit is fed to a voltage regulator 19 through clamping means 18 which prevents the output of the computing unit from falling below a minimum value. The voltage regulator controls the voltage of the AC source 1 and applies it across the winding of the induction motor 2 to maintain a desired relationship between the supply power and the feedback power as determined by the computing unit 17. A control power source 20 provides operating voltages to components 11-13 and 17-19.

The voltage detector 11 shown in FIG. 2A employs a transformer 21. Terminals 22 and 23 are connected across the winding of the induction motor, terminal 24 is connected to a common line of the control power source 20, and terminal 25 is the detector output. FIG. 2B illustrates an alternate voltage detector 11 in the form of a voltage divider including series resistors 26 and 27. Terminals 22-25 are connected in the same manner as those in FIG. 2A.

The current detector 12 illustrated in FIG. 3A comprises a current transformer coil 28 wound around an electrical lead 29 connected to terminal 22 of the induction motor winding. Terminal 221 of the lead 29 is connected to the voltage regulator 19, and a voltage is developed across resistor 281 proportional to the current flowing through coil 28. Terminal 24 is connected to the common line of the control power source 20, and terminal 30 is the detector output. FIG. 3B illustrates an alternate current detector 12 comprising a simple series resistor 31. The voltage drop across it is proportional to the current flow, and terminals 24, 30 and 221 are connected in the same manner as those in FIG. 3A.

In the power detection circuit 13 illustrated in FIG. 4A, terminal 25 is connected to the voltage detector 11, and terminal 30 is connected to the current detector 12. An analog multiplier 32 multiplies the outputs of detectors 11 and 12. Rectifier 33 passes only the positive output of the multiplier, while rectifier 34 passes only the negative output. The output of rectifier 33 is fed through a filter composed of a resistor 35 and a capacitor 36 to output terminal 37, which thus carries the integrated average value of the positive product of current and voltage, and therefore indicates the supply power. In a similar manner, the output of rectifier 34 is fed through a filter composed of a resistor 38 and a capacitor 39, and an analog inverter 401 to output terminal 40, which represents the integrated average of the negative product of voltage and current, and therefore indicates the feedback power. Resistors 331 and 341 protect the multiplier 32 against a shortcircuit due to the failure of either of the rectifiers 33 and 34 and further serve to isolate rectifiers 33 and 34 from each other.

FIG. 4B illustrates an alternate power detection circuit 13, wherein terminals 25, 30, 37 and 40 are identical to those in FIG. 4A. The output line 411 of comparator 41 provides an H level output when terminal 25 is positive, and an L level output when terminal 25 is negative; output line 412 provides an output which is the inverse of output line 411. The output line 421 of comparator 42 provides an H level output when terminal 30 is positive, and an L level output when terminal 30 is negative; output line 422 provides an output which is the inverse of output line 421. AND gate 43 provides an H level output on line 431 when terminals 25 and 30 are both positive, and an L level output otherwise. In a similar manner, AND gate 44 provides an H level output on line 441 when both input terminals are negative and an L level output otherwise, AND gate 45 provides an H level output on line 451 when terminal 25 is negative and terminal 30 is positive, and an L level output otherwise, and AND gate 46 provides an H level output on line 461 when terminal 25 is positive and terminal 30 is negative, and an L level output otherwise. OR gate 47 receives the signals on lines 431 and 441 and its logical sum output is averaged through a filter comprising a resistor 49 and a capacitor 50 and is coupled to an output terminal 37. Similarly, OR gate 48 receives the signals on lines 451 and 461 and provides a logical sum output which is averaged through a filter constituted by resistor 51 and capacitor 52 and is coupled to terminal 40.

The power detection circuit of FIG. 4B is less expensive than that of FIG. 4A since its components are largely digital in nature, although its output is attendantly not as accurate as that provided by the analog embodiment of FIG. 4A.

The computing unit 17 shown in FIG. 5 receives the supply power output and feedback power output from terminals 37 and 40 of the power detection circuit, and includes an analog inverter 601, an operational amplifier 69, resistors 70, 71, and a capacitor 72. The output of the computing unit at terminal 73 is coupled to the voltage regulator 19 through the clamping means 18 to appropriately control the voltage applied across the induction motor winding. The current flowing through the motor winding, as well as the apparent power and the effective power, is thus constantly adjusted to provide inputs to the computing unit 17 which satisfy the relationship set forth below.

Assuming that the voltage on terminal 37 is $V_{p1}$, the voltage on terminal 40 is $V_{p2}$, resistor 70 has a value or $R_{p1}$, and resistor 71 has a value of $R_{p2}$, then the following relationship is established by the computing unit:

$$-\frac{V_{p1}}{R_{p1}} + \frac{V_{p2}}{R_{p2}} = 0.$$

This may be transposed to:

$$\frac{V_{p2}}{V_{p1}} = \frac{R_{p2}}{R_{p1}}$$

which clearly establishes the ratio of the supply power $V_{p2}$ to the feedback power $V_{p1}$ so as to be a fixed value determined by the ratio of $R_{p2}$ (resistor 71) to $R_{p1}$ (resistor 70).

The ratio of the supply power to the feedback power thus tends to decrease as the load on the motor is lessened when the input voltage across the motor winding is constant, and similarly tends to decrease when the motor load is held constant and the input voltage increases. Therefore, as the motor load is decreased or the input voltage is increased so that the ratio of $V_{p2}$ to $V_{p1}$ tends to become smaller than the ratio of $R_{p2}$ to $R_{p1}$, the computing unit 17 operates to reduce the input voltage. This increases the ratio of $V_{p2}$ to $V_{p1}$, which desirably results in a fixed value therefor corresponding to the ratio established by the values of resistors 70 an 71. In the circuit of FIG. 5, a reduction of the input voltage results in a corresponding reduction of the output at terminal 73, which may approach zero. This could make it difficult or impossible to start the induction motor 2, depending upon its type and characteristics, when the input voltage is reduced while the effective to apparent power ratio is held fixed. In order to avoid this, the value of the voltage at terminal 73 is clamped, i.e., the value of the voltage is prevented from falling below a minimum value.

Figure 7:
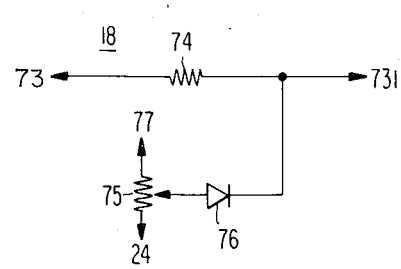

The clamp circuit shown in FIG. 7 receives the output of the computing unit 17 on terminal 73, and includes a fixed resistor 74, a variable resistor 75 and a rectifier 76. Terminal 77 is connected to a positive output of the control power source 20. If the voltage on output terminal 731 drops below that at the tap of resistor 75, rectifier 76 becomes conductive to thus clamp the output voltage at terminal 731 to a fixed value, i.e. the top voltage.

Figure 6:
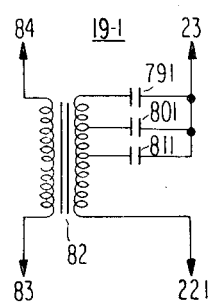
Figure 8A:
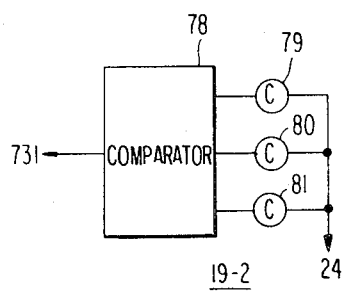

FIGS. 6 and 8A illustrate an embodiment of the voltage regulator 19, separated into components 19-1 and 19-2. The clamp output at terminal 731 is applied to a comparator 78 having a hysteresis characteristic, which operates contactors 79-81 according to the applied voltage level. Components 791, 801 and 811 are contacts controlled by the respective contactors 79-81, and are connected in the secondary winding of a transformer 82 whose input terminals 83, 84 are connected across the AC power source 1, and one of whose output terminals 221 is connected to the current detector 12. The other output terminal 23 is connected to one end of the induction motor winding and to the voltage detector 11. The operation of one of the contactors 79-81 and associated contacts 791-811 in accordance with the applied voltage level at terminal 731 thus regulates the input voltage applied across the winding of the induction motor 2.

Figure 8B:
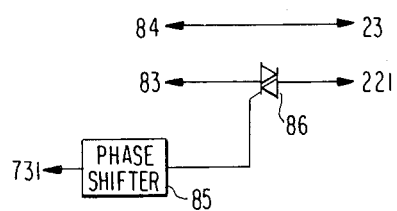

In the alternate voltage regulator embodiment shown in FIG. 8B, terminals 23, 83, 84, 221 and 731 are connected in the same manner as those in FIGS. 6 and 8A. Here, a phase shifter 85 functions in accordance with the input voltage level on terminal 731 to control the conduction of a triac 86 connected in series in one of the induction motor supply lines.

The control power source 20 is not disclosed with detail as it may take any one of a number of well known and conventional forms.

Although the foregoing embodiment is disclosed in connection with a single phase induction motor, the teachings of this invention are equally applicable to a three-phase induction motor with the provision of three control circuits as shown in FIG. 1, individually connected between the AC power source and the three phases of the motor winding.

The voltage regulator 19 can also employ a variable voltage component when a variable voltage-variable frequency power source (inverter) is used.

In the described embodiment, the ratio of the supply power to the feedback power is established by fixed resistors, but a variable ratio relationship may also be provided by an appropriate pattern control network or voltage variable resistors.

As described above, according to the present invention, an induction motor is controlled in its operation such that the ratio of the supply power to the feedback power is fixed and held at an optimum value in spite of variations in the applied voltage and/or the motor load, whereby losses in the motor can be minimized and significant power savings can be realized. When the induction motor is operated under light load conditions, the input voltage applied to the motor winding is attendantly reduced, which minimizes unwanted vibrations.

What is claimed is:

1. A power control circuit for an induction motor, said power control circuit comprising:
   a detecting means connected between an alternating current power source and said induction motor for detecting the supply power and the feedback power flowing between said source and said motor;
   a voltage regulating means for controlling an input voltage applied to said induction motor such that the ratio between the supply power and the feedback power is maintained at a predetermined value;
   wherein said supply power is defined to be equal to the product of the instantaneous value of said voltage applied to said motor and a current flowing through said motor when said product is positive in value; and
   wherein said feedback power is defined to be equal to the product of the instantaneous value of said voltage applied to said motor and said current flowing through said motor when said product is negative in value.

2. A power control circuit as claimed in claim 1, wherein said supply power and said feedback power are detected by means for determining the time averages of the logical product of a digital signal representative of said voltage applied to said induction motor and a digital signal representative of the polarity of said current flowing through said motor.

3. A power control circuit as claimed in claim 1, wherein said detector means comprises an analog multiplier for multiplying an analog signal representative of said voltage applied to said motor and a signal representative of said current flowing through said motor;
   wherein an output of said analog multiplier is representative of said supply power when said output is positive in value and is representative of said feedback power when said output is negative in value;
   and wherein said detecting means further comprises separating means for separating said output of said analog multiplier into two paths, the path being determined on the basis of the polarity of said output of said multiplier.

4. A power control circuit as claimed in claims 2 or 3, wherein said voltage regulating means comprises a voltage regulator unit connected between said alternating current power source and said induction motor.

* * * * *